2,899,816
COMBINED WASHER-DRYER

Jerome G. Jacobsen, Jr., Mansfield, Ohio, assignor to Westinghouse Electric Corporation, East Pittsburgh, Pa., a corporation of Pennsylvania Application January 16, 1956, Serial No. 559,251

1 Claim. (Cl. 68—20)

This invention relates to a machine for washing and drying fabrics in a common chamber, the drying being effected by tumbling the fabrics in a stream of air, heated for vaporizing water in the fabrics, which air is then cooled for condensing and precipitating vapor from the air. An object of the invention is to provide an improved machine of this kind.

It is a further object of the invention to provide improved means for introducing water to a machine of the class set forth for washing operations and for cooling the air during drying periods.

A further object of the invention is to provide an improved water-cooled condenser structure for a machine for drying fabrics in which recirculated air is alternately heated and cooled for, respectively, vaporizing water from the fabrics and condensing the vapor from the air.

In practicing the invention, the drying chamber is arranged within a casing having a cylindrical side wall, and a shell, arranged exteriorly of the side wall, encloses a lower arcuate portion of the side wall for defining a condensing compartment, preferably of arcuate configuration. The lowermost portions of the drying chamber and the condenser compartment are communicating and water for both the washing operations and the cooling of the air during drying periods is admitted to the upper end of the condenser. Vitiated water is discharged from the lowermost region of the condenser compartment which defines a sump. The washing waters are admitted at a relatively high rate and thoroughly wash the walls of the condenser of any foreign matter such as lint. Cooling water is admitted during drying periods at a relatively low rate and means are provided for directing the cooling water over the arcuate wall portion separating the drying chamber and the condenser compartment in a wide film providing good heat transfer relationship between the water and air passing upwardly through the condenser compartment. Some cooling of the arcuate wall is effected, but no loss in efficiency occurs because of this as air in the drying chamber being cooled by this wall is adjacent to the passage to the condensing compartment and moving rapidly thereto. Any condensate precipitated from this air passes to the sump. There is substantially no cooling of the outer shell of the condenser which, of course, is subjected to the ambient atmosphere.

Air cooled and dried in the condenser is translated to a heater where its temperature is raised and its relative humidity lowered for increasing its capacity to vaporize water from the fabrics. This hot dry air is translated through the drying compartment and becomes substantially saturated and then enters the lower end of the condenser. The air next moves upwardly through the condenser in counter flow relationship with the cooling water for dehydration and the cycle is continued.

The foregoing and other objects are effected by the invention as will be apparent from the following description taken in connection with the accompanying drawings, forming a part of this application, in which:

Fig. 5 is a section of a detail taken along line V—V of Fig. 1.

Reference will now be had to the drawings wherein the invention is disclosed applied to a domestic clothes washing and drying machine including a washing and drying unit, generally indicated at 10 and suitably supported within a housing 11. The latter includes a front wall 12 having an upper portion 13 inclined upwardly and rearwardly of the machine and provided with an access opening indicated at 14. The latter is closed by a suitable door structure 15 hinged, in any suitable manner, as shown at 16, to the front wall 12 of the housing.

Figure 3:
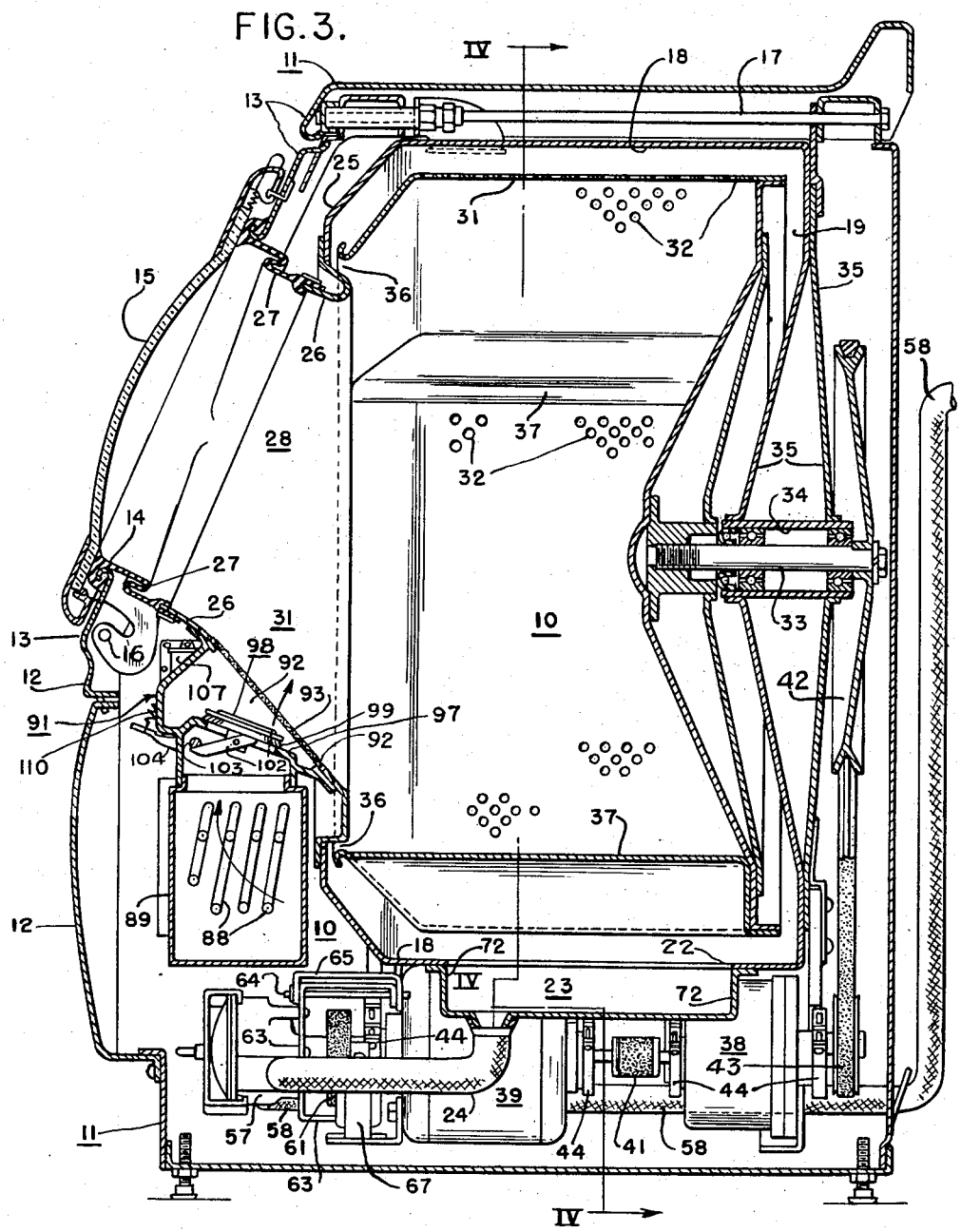
Fig. 3 is a section taken along the line III—III of Fig. 2.

The washing and drying unit 10 is supported within the housing in any suitable manner but is preferably suspended from a supporting rod 17, the latter being carried by the housing 11. Further reference to this supporting means is made hereinafter. The unit 10 includes a tub or casing structure 18 enclosing a generally cylindrical washing and drying chamber 19 and an arcuate condensing compartment 21, the latter communicating with the chamber 19 by means of an opening 22 at the bottom of the chamber 19. The bottom portion of the condensing compartment 21 beneath the opening 22 defines a sump 23 from which water may be drained from the casing 18 by means of a conduit 24 as described hereinafter. The casing 18 is provided with a front wall 25 which includes a chute 26 inclined upwardly and forwardly of the chamber wall 25. As set forth hereinafter, there may be relative movement between the unit 10 and the housing 11 so that a flexible wall or boot 27 is provided between these members. As best shown in Fig. 3, the boot 27 is connected to the outer end of the chute 26 and peripherally thereof, the opposite or outer end of the boot 27 being fixed to the front wall 13 peripherally of the access opening 14 therein. The boot 27 and the chute 26 enclose a relatively large access passage 28 for the ingress and egress of fabrics to and from the casing 18.

During treatment, the fabrics are tumbled within a rotating basket 31, a portion of which is perforate, a number of perforations being indicated at 32. The basket 31 is disposed for rotation about a generally horizontal axis within the tub 18 and, in this connection, is provided with a shaft 33 extending rearwardly of the basket 31 and suitably journaled in a bearing structure 34. The latter is carried by a rear wall 35 of the casing structure 18. The basket 31 is provided with a relatively large opening 36 at the front side thereof which registers with the access passage 28 in the chute structure 26. During slow speed rotation of the basket 31, the tumbling of the fabrics is promoted by a plurality of vanes 37 extending radially inwardly within the basket 31.

Rotation of the basket at relatively low speed of, for example, 45 r.p.m. during washing and drying periods and at a relatively high speed of approximately 180 r.p.m. during centrifuging periods is effected by an adjustable two speed mechanism, generally indicated at 38 and driven by an electric motor 39 through a flexible coupling 41. (See Fig. 3.) The two speed mechanism 38 is of any suitable construction commonly employed for driving washing and centrifuging apparatus of the domestic type.

As the construction and operation of such two speed mechanisms are well understood in the art, further description is deemed unnecessary. As shown, the mechanism 38 drives a sheave 42 by means of a belt 43, the sheave 42 being suitably secured to the shaft 33 of the basket. The two speed mechanism 38 and the motor 39 are carried by the casing 18 by means of a series of supporting brackets generally indicated at 44.

During operation of the basket at centrifuging speed and during acceleration of the basket to such speed, objectionable vibrations may be excited in the suspended unit 10 because of any load unbalance in the basket. Due to the pendulum-like support of the unit 10 from the rod 17, horizontal components of these vibrations are isolated in part from the outer housing 11 and, therefore, the forces tending to slide the housing 11 on its support are reduced. Vertical components of the vibrations tending to lift the machine are resisted by the mass of the unit 10 as well as the housing 11. This method of supporting the unit 10 is disclosed and claimed in E. K. Clark, Patent No. 2,813,415, granted November 19, 1957 to the assignee of the present application. The purpose of this method of suspension of the unit 10 is to permit in a free standing machine, a higher centrifuging speed than is obtainable where the unit 10 is fixed to the outer housing 11.

Figure 4:
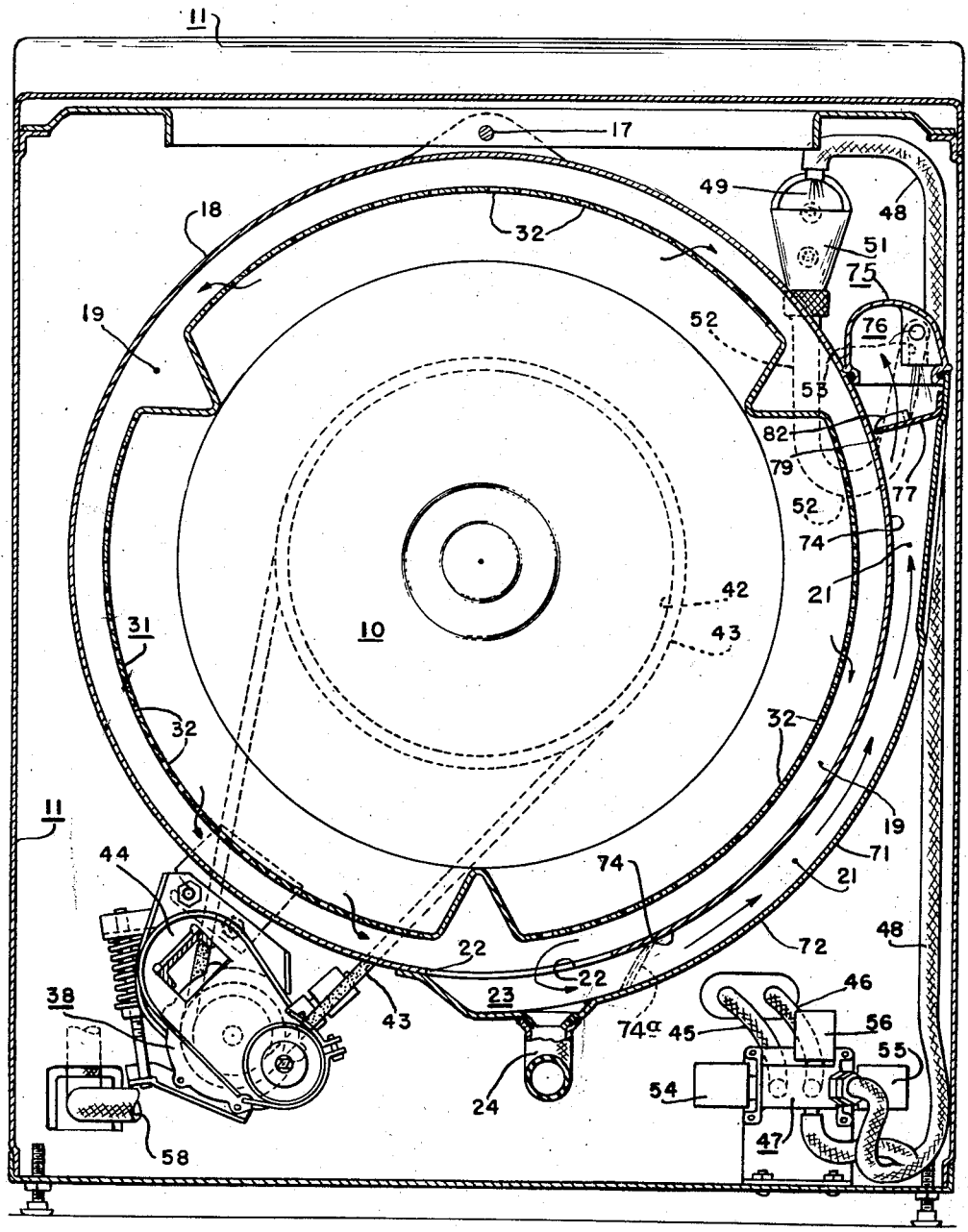
Fig. 4 is a section taken along the lines IV—IV of Fig. 3.

Washing water is conveyed to the unit 10 in any conventional manner. As shown, hot and cold water is conveyed through respective conduits 45 and 46 to a water mixing device 47 (Fig. 4). Water is conveyed from the water mixing device 47 through a conduit 48 to an elevated region of the housing 11 and across an air gap 49 of a suitable vacuum breaker 51 and thence through a conduit 52 to a water adission orifice 53, arranged in accordance with the invention and best shown in Figs. 4 and 5. The water mixing device 47 may be of any conventional construction and employs a plurality of valves (not shown) for controlling the passage of water from the hot and cold water conduits 45 and 46 to the conduit 48. These valves are actuated by respective solenoids 54, 55 and 56. It will be understood that when the solenoid 54 is energized hot water is delivered at a relatively high rate from the device 47 for high temperature washing. When the valve 55 is energized, a lower temperature mixture of hot and cold water, is delivered at a relatively high rate to the conduit 48 and, when the solenoid 56 is energized, cold water alone is delivered at a relatively low rate of the order of one-half gallon per minute to the conduit 48. The latter operation occurs during drying periods, the cold water being employed for condensing vapor from the air in the condensing compartment 21 as set forth in detail hereinafter.

Figure 2:
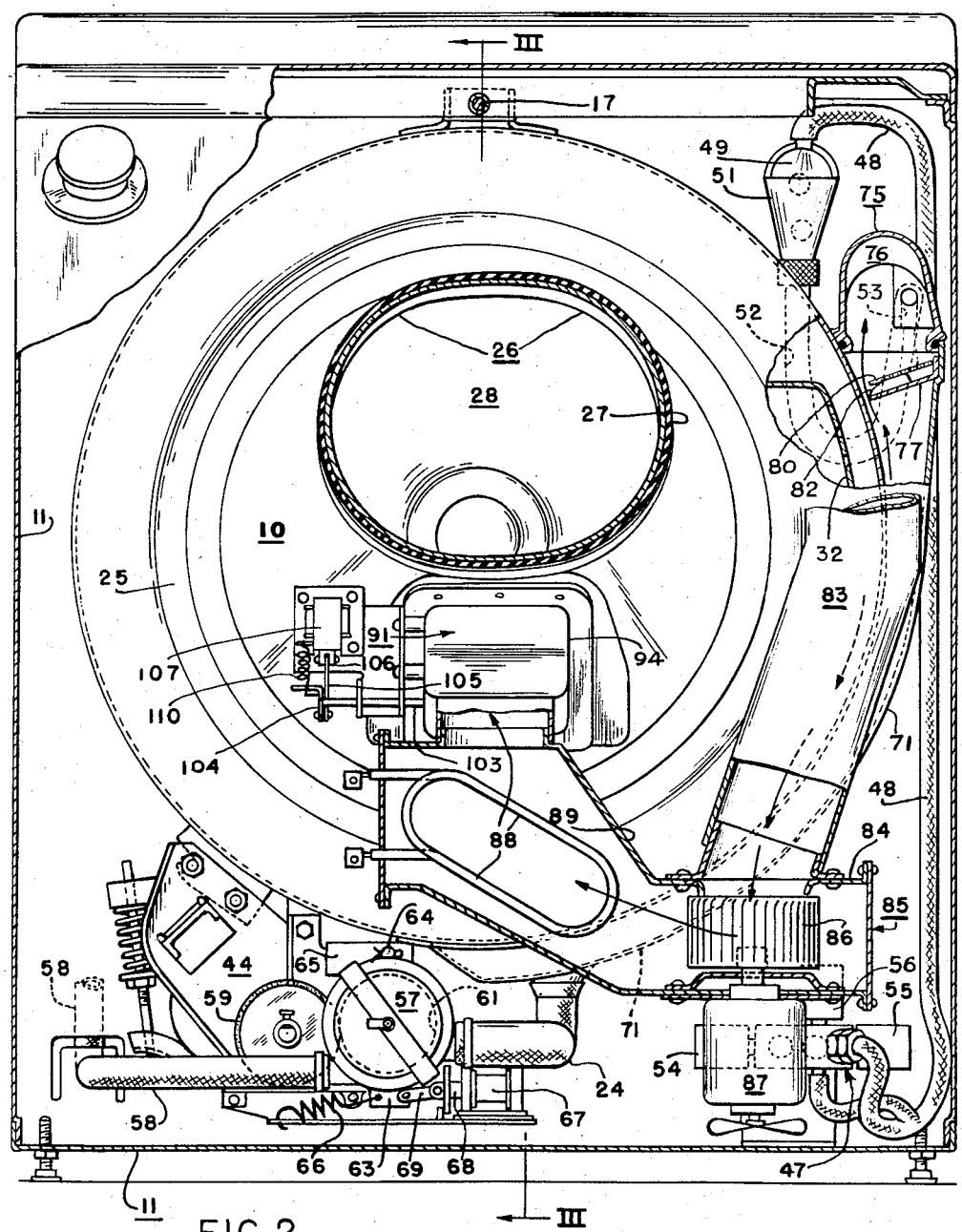
Fig. 2 is a front view in section taken along the line II—II of Fig. 1.

Vitiated water is discharged from the casing 18 preferably by means of a centrifugal pump 57, the intake of which is connected to the conduit 24. The pump discharges into a conduit 58 extending outwardly through the rear wall of the housing 11 to a suitable point of discharge (Fig. 2). Since there is no valve connected in the water dicharge system, the conduit 24, the pump 57 and the portion of the discharge conduit 58, which is below the level of water in the casing 18 are flooded when a body of washing water is contained within the casing 18. Accordingly, it is understood that the discharge conduit 58 must extend to a point above said level of the water in order to preclude gravitation of water from the tub through this conduit. The discharge of water from the tub is, of course, effected by starting operation of the pump. The pump may be driven by the main motor 39 in any suitable manner. As shown, a friction wheel 59 having a resilient tread is driven by the motor 39 and is engageable with a second friction wheel 61 driving the pump (see Figs. 2 and 3). Operation of the pump 57 is terminated by disconnecting the friction wheels 59 and 61. As shown, the pump 57 is carried by a bracket 63 suspended from a pivot pin 64, the latter being supported by a bracket 65 secured in any well understood manner to the casing 18. A tension spring 66 biases the pump 57 to the left, as viewed in Fig. 2, so that the friction wheels 59 and 61 are engaged for the driving of the pump. In order to disengage the friction wheels 59 and 61, a magnet 67 is provided, the movable armature 68 of which is connected to the pump 57 by a link 69. Upon energization of the magnet 67, the link 69 and pump 57 are swung to the right, as viewed in Fig. 2, for the separation of the friction wheels 59 and 61. It will be understood that the conduits 24 and 58 are flexible to permit the recited movement of the pump 57.

Figure 1:
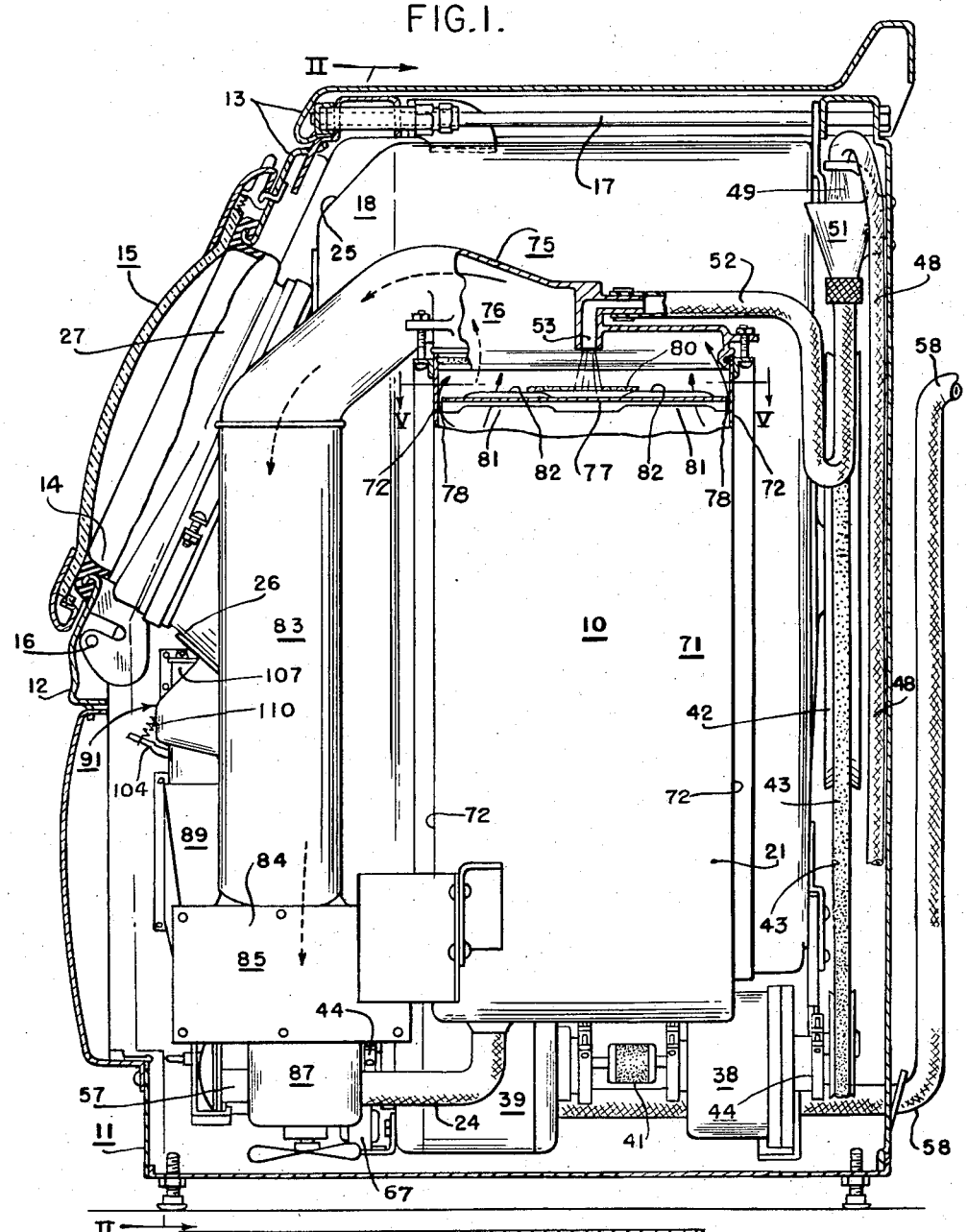
Fig. 1 is a side elevation of a washer-dryer constructed in accordance with the invention, the outer housing of which is shown in section.

Consideration will now be given to the air treating apparatus which is effective during clothes drying periods. In accordance with the invention, the condensing compartment 21 is preferably formed by a shell 71 which, in cross section, is channel shaped, as best shown in Fig. 5. The shell 71 has opposed side walls 72, the inner ends of which are secured to an arcuate portion 74 of the casing 18 in any suitable manner as, by welding. The upper end of the condensing compartment 21 is closed by a header 75 having an air passage 76 formed therein. The header 75 may also include the water admission orifice 53 referred to heretofore, as best shown in Fig. 1. Adjacent the upper end of the shell 71, a baffle or tray 77 is arranged transversely within the condensing compartment 21. The tray 77 is suitably secured within the shell 71 with its side margins spaced from the side walls 72 to form narrow slots indicated at 78. Also the inner edge of the tray or baffle 77 is spaced from the arcuate wall portion 74 to define narrow slots or passages 79. The tray 77 is further provided with a pair of relatively large openings 81 for the passage of air moving upwardly in the condensing compartment 21. The water admitting orifice 53 is indicated in broken lines in Fig. 5 and it will be noted that the water is discharged in a mid portion of the tray 77 for passage through the slots 78 and 79. In order to prevent the water from pouring over the edge of the air openings 81 during drying periods, the edges of the baffle 77 forming these openings are turned upwardly as indicated at 82 to form dams.

The baffle 77 is sloped downwardly toward the arcuate wall portion 74, as shown in Fig. 4, in order that substantially all of the cooling water delivered thereto at low rate during drying periods gravitates toward the slots 79 and spreads out into a thin film moving downwardly over the wall portion 74. Some water may escape to the side slots 78, but the majority of the water will gravitate to the slots 79. At this time, no water will pass to the air openings 81 because of the dams 82. The purpose of filming substantially all of the water over the wall 74 at this time is to provide a large area of heat transfer between the water and the air passing through the condenser compartment 21. This, together with the fact that the flow of water and air are counter to each other, effects a high rate of heat exchange. It will be noted that substantially none of the cooling effect of the water is wasted cooling the shell 71 which is subjected to the ambient atmosphere. Cooling of the arcuate wall 74 does not represent any loss, as heat is absorbed thereby from the adjacent air in the drying chamber, which air is moving toward the opening 22 to the condenser. Condensation of vapor from air adjacent the wall 74 flows through opening 22 to the sump 23 for removal. It will be understood that the film of water clings to the wall 74 by adhesion until it reaches a lower region of the wall 74 where it falls to the bottom of the compartment 21 as shown at 74a.

During delivery of washing water to the baffle 77 at high rate, water will flow to both series of slots 78 and 79 for passage therethrough and may also overflow the dams 82 and pour down through the air openings 81. Accordingly, all walls defining the condenser compartment 21 are scoured with water and small collections of lint or other matter which may gather thereon are flushed away. In order to prevent the splashing of water projected by the orifice 53 into engagement with the baffle 77 and its entry into the air passage 76, a piece of wire cloth, indicated at 80, overlies the portion of the baffle 77 beneath the orifice 53. The wire cloth 80 may be held in any suitable manner upon the baffle so that all water discharged by the orifice must pass therethrough.

The air which moves upwardly within the condensing compartment 21 travels through the air passage 76 and enters a downwardly extending duct 83, the lower portion of which communicates with the casing 84 of a blower 85. The runner of the blower is shown at 86 and is driven by a suitable electric motor 87. The air discharged by the blower 85 is heated by an electric heater 88 of any suitable construction and arranged within a shell 89. As shown, the heater 88 is of the sheathed type. Preferably, heat insulating material, not shown, is packed around the heater shell 89 to reduce the radiation of heat therefrom to the surrounding atmosphere.

The relatively dry heated air passing from the heater 88 travels through a valve mechanism, generally indicated at 91, and thence through an air discharge opening 92 formed in the bottom portion of the chute 26. As shown, a screen 93 may be arranged in the opening 92 to prevent articles of clothing from entering the valve mechanism 91. The heated air discharged through the opening 92 is directed through the open front of the basket 31 and directly into contact with the tumbling fabrics. Accordingly, a relatively large area of the bundle of fabrics is presented to the stream of heated air at all times and the vaporization of water from the fabrics is carried out in the most efficient manner. As set forth, the humidified air passes through the opening 22 at the bottom of the casing and enters the condensing compartment 21. As this air passes upwardly through the compartment 21, it is subjected to the relatively large area of the cold water film passing downwardly over the arcuate wall portion 74. The temperature of the air is depressed substantially below its dew point temperature so that vapor in the air is condensed and precipitated in the compartment 21 for discharge by the pump 57 along with the cooling water. It might also be pointed out at this time that lint particles carried by the air are also entrained in the water and discharged by the pump. The cool, dried air leaving the condensing compartment 21 passes through the openings 81 and the passage 76 for reheating by the heater 88 as described.

As best shown in Figs. 2 and 3, the valve mechanism 91 includes a body 94 having a valve seat 97 and a valve member 98 cooperating therewith. The latter has a resilient rim 99 engageable with the seat 97. The valve 98 is secured to an arm 102, the latter being welded or otherwise fixed to a shaft 103. The shaft 103 is suitably journaled in the valve body 94 and has an actuating arm 104 secured to the outer end thereof. The latter arm 104 is linked, as shown at 105, to the armature 106 of an electro-magnet 107. The arrangement is such that, when the magnet 107 is deenergized, the valve 91 is closed to prevent the entrance of water splashing about in the chute 26 during washing periods from entering the heater shell 89. When the magnet 107 is energized the valve 91 is open to permit circulation of air to the chute 26, this position being effective during drying periods. Preferably, a tension spring 110 is employed to bias the actuating arm 104 and shaft 103 to the valve-closed position thereof. The electro-magnet 107 and the heater 88 are, preferably, energized and deenergized simultaneously by a suitable switching means, not shown, so that the valve 91 will be open at any and all times that the heater is rendered active for the heating of air. A valve mechanism of the type shown at 91 is disclosed and claimed in William A. Johnston, Patent No. 2,813,414, granted November 19, 1957, to the assignee of the present application.

During washing and rinsing periods, the fabrics are tumbled in the body of fluid in the casing 18 by the rotating basket, all of which is well understood. The body of water during these operations is agitated and splashed about. The entering of the agitated water into the air heater is prevented as the valve 91 is closed during these operations. At the conclusion of the final rinse period, the pump is operated, as previously described, by the deenergization of its magnet 67 and the engagement of the friction wheels 59 and 61. The vitiated rinse water is discharged and operation of the pump continues throughout the centrifuging and drying steps which follow. During centrifuging, a substantial portion of the water contained in the fabrics is extracted and then removed by the pump. The drying step follows the centrifuging step and is initiated by energizing the heater 88, the fan 86 and the magnet 107 with the consequent opening of the valve 91. At this time, cold water is delivered to the condenser for condensing vapor in the air stream. The drying operation has been described heretofore in detail and needed not be repeated. At the conclusion of the drying operation, the apparatus is deenergized and the washed and dried fabrics may then be removed.

While the invention has been shown in but one form, it will be obvious to those skilled in the art that it is not so limited, but is susceptible of various changes and modifications without departing from the spirit thereof.

What is claimed is:

In apparatus for washing and drying fabrics, the combination of a casing enclosing a washing and drying chamber and a condensing compartment, means for tumbling fabrics within said chamber during washing and drying periods, said casing including an arcuate wall member separating said chamber and compartment and having a passage formed therein for the flow of water and air from the chamber to the bottom of the compartment, said compartment extending upwardly about said arcuate wall member to adjacent an upper region of the chamber, a hollow header closing the top of said condensing compartment, means for withdrawing air from the compartment during drying periods, means for heating the air and returning it to said chamber, means including an orifice within said header for admitting water at relatively high rate to the upper end of said compartment for washing operations and at a lower rate for condensing vapor in the air withdrawn from the compartment during drying periods, a baffle supported within the compartment and extending transversely thereof for intercepting water discharged by said orifice, said baffle having marginal portions spaced from the walls of the compartment and defining slots for the passage of water to the compartment, said baffle being recessed adjacent said arcuate wall for forming a relatively large opening for passage of air, a dam extending upwardly from the baffle at the margin of said air opening, said baffle being inclined toward the arcuate wall so that a substantial portion of said condensing water gravitates toward the arcuate wall and flows thereover as a film to the bottom region of the condensing compartment and means for discharging vitiated water from the bottom of the condensing compartment.

References Cited in the file of this patent

UNITED STATES PATENTS

| | | |
|---|---|---|
| 2,451,692 | Pugh | Oct. 19, 1948 |
| 2,607,209 | Constantine | Aug. 19, 1952 |
| 2,644,245 | Hammell et al. | July 7, 1953 |
| 2,680,916 | Smith | June 15, 1954 |
| 2,717,457 | Smith | Sept. 13, 1955 |
| 2,800,008 | Raczynski | July 23, 1957 |